US012614285B2

(12) United States Patent
Zhu et al.

(10) Patent No.: US 12,614,285 B2
(45) Date of Patent: Apr. 28, 2026

(54) IMAGE ANALYSIS METHOD AND APPARATUS, COMPUTER DEVICE, AND READABLE STORAGE MEDIUM

(71) Applicants: Suzhou Cleva Precision Machinery & Technology Co, Ltd, Suzhou (CN); Skybest Electric Appliance (Suzhou) Co., Ltd., Suzhou (CN)

(72) Inventors: Shaoming Zhu, Suzhou (CN); Xue Ren, Suzhou (CN)

(73) Assignees: Suzhou Cleva Precision Machinery & Technology Co., Ltd., Suzhou (CN); Skybest Electric Applicance (Suzhou) Co., Ltd., Suzhou (CN)

( * ) Notice: Subject to any disclaimer, the term of this patent is extended or adjusted under 35 U.S.C. 154(b) by 303 days.

(21) Appl. No.: 18/354,097

(22) Filed: Jul. 18, 2023

(65) Prior Publication Data

US 2024/0029268 A1     Jan. 25, 2024

(30) Foreign Application Priority Data

Jul. 19, 2022     (CN) .......................... 202210846907.4

(51) Int. Cl.
| | |
|---|---|
| *G06T 7/12* | (2017.01) |
| *G06T 7/11* | (2017.01) |
| *G06T 7/13* | (2017.01) |
| *G06T 7/136* | (2017.01) |
| *G06T 7/174* | (2017.01) |

(Continued)

(52) U.S. Cl.
CPC ................. *G06T 7/12* (2017.01); *G06T 7/11* (2017.01); *G06T 7/13* (2017.01); *G06T 7/136* (2017.01); *G06T 7/174* (2017.01); *G06T 7/40* (2013.01); *G06T 7/90* (2017.01); *G06T 2207/10024* (2013.01); *G06T 2207/30242* (2013.01)

(58) Field of Classification Search
CPC ..... G06T 7/12; G06T 7/11; G06T 7/13; G06T 7/136; G06T 7/174; G06T 7/40; G06T 7/90; G06T 2207/10024; G06T 2207/30242; G06V 10/26; G06V 10/44; G06V 20/56; G06V 10/56
See application file for complete search history.

(56) References Cited

U.S. PATENT DOCUMENTS

| | | | | |
|---|---|---|---|---|
| 2018/0225543 A1* | 8/2018 | Kobori | ............... | G06F 18/2323 |
| 2018/0293742 A1* | 10/2018 | Piekniewski | ........... | G06T 7/285 |

FOREIGN PATENT DOCUMENTS

| | | | | |
|---|---|---|---|---|
| WO | WO-2014173290 A1 * | 10/2014 | ............. | G06V 20/56 |

* cited by examiner

*Primary Examiner* — Chan S Park
*Assistant Examiner* — Daniel C Chang
(74) *Attorney, Agent, or Firm* — JK Intellectual Property Law, PA

(57)     ABSTRACT

An image analysis method includes the steps of obtaining a saturation channel image and a value channel image according to an original image; obtaining a relative deviation value image based on the saturation channel image and the value channel image, wherein the relative deviation value image represents relative deviations between saturation and value; extracting several contours from the relative deviation value image; determining target parameter values corresponding to each contour; and Determining according to analysis results of the target parameter values corresponding to each contour whether there is a non-working region in the original image. A related image analysis apparatus, computer device, and computer readable storage medium are also disclosed.

13 Claims, 8 Drawing Sheets

(51) Int. Cl.
G06T  7/40          (2017.01)
G06T  7/90          (2017.01)

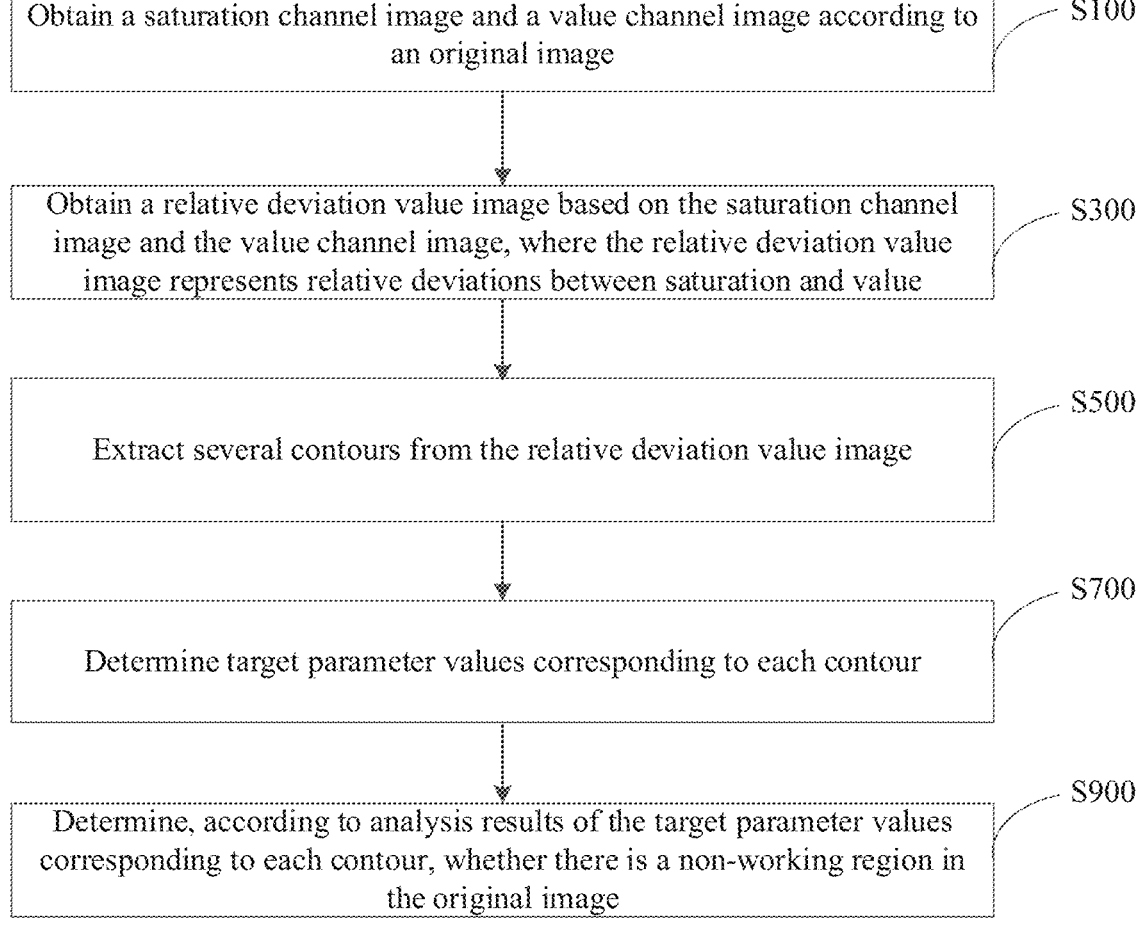

Obtain a saturation channel image and a value channel image according to an original image    ⟋ S100

Obtain a relative deviation value image based on the saturation channel image and the value channel image, where the relative deviation value image represents relative deviations between saturation and value    ⟋ S300

Extract several contours from the relative deviation value image    ⟋ S500

Determine target parameter values corresponding to each contour    ⟋ S700

Determine, according to analysis results of the target parameter values corresponding to each contour, whether there is a non-working region in the original image    ⟋ S900

FIG. 1

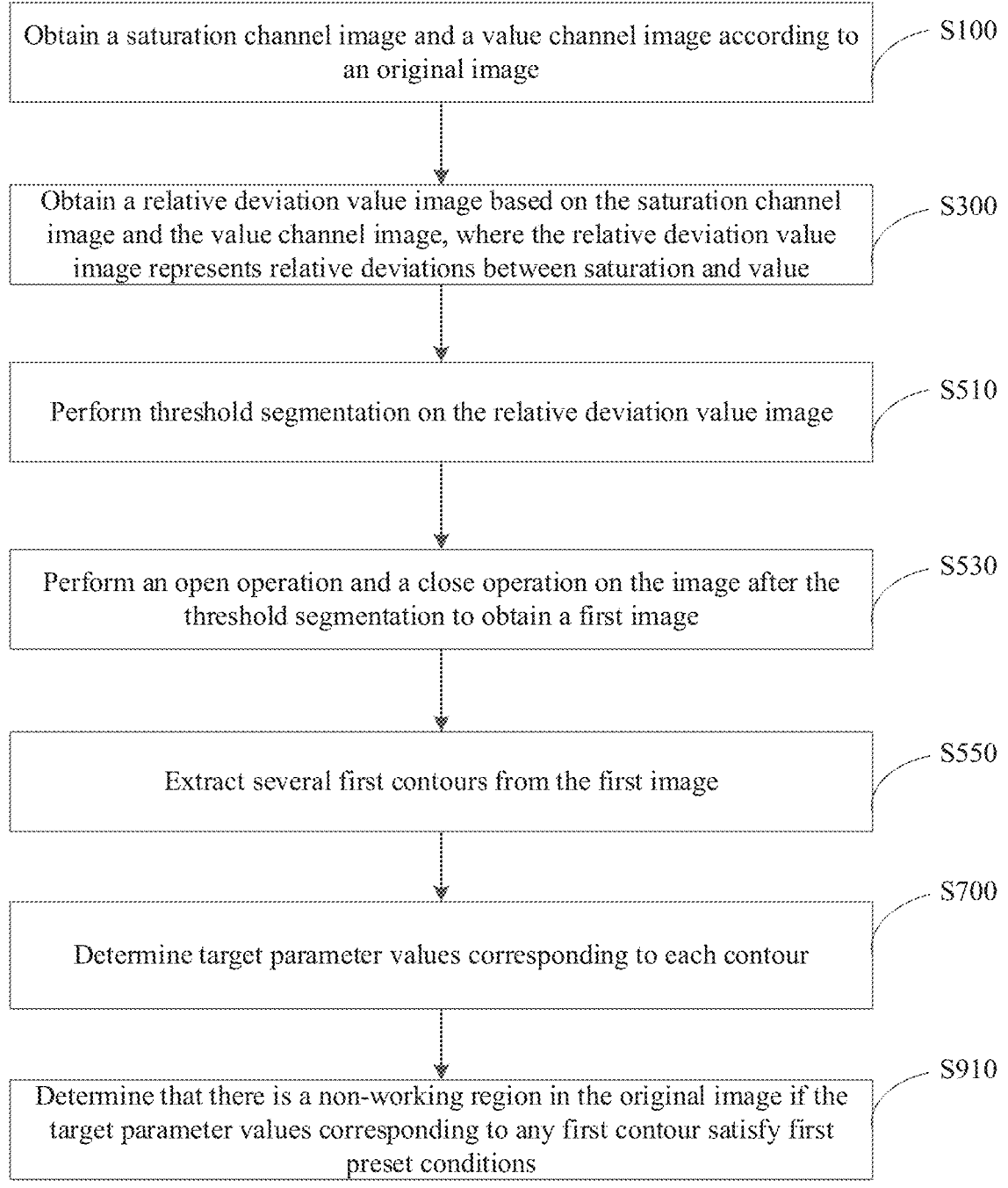

| Obtain a saturation channel image and a value channel image according to an original image | S100 |

| Obtain a relative deviation value image based on the saturation channel image and the value channel image, where the relative deviation value image represents relative deviations between saturation and value | S300 |

| Perform threshold segmentation on the relative deviation value image | S510 |

| Perform an open operation and a close operation on the image after the threshold segmentation to obtain a first image | S530 |

| Extract several first contours from the first image | S550 |

| Determine target parameter values corresponding to each contour | S700 |

| Determine that there is a non-working region in the original image if the target parameter values corresponding to any first contour satisfy first preset conditions | S910 |

FIG. 2 orgMat          prevObstacleMat sMat vMat          normVMat          cannyVMat dMat          normDMat          otsuDMat hMat          cannyHMat avgHValue = 84.83
avgCanH = 0.069
avgCanV = 0.102 maxColor = 1149
avgVldpxN = 0.795
avgBright = 239.03 boundRect.br.x = 160
boundRect.pxN = 4344
boundRect.width = 160
boundRect.height = 79

8 contours usObstMat          8ᵗʰ contour

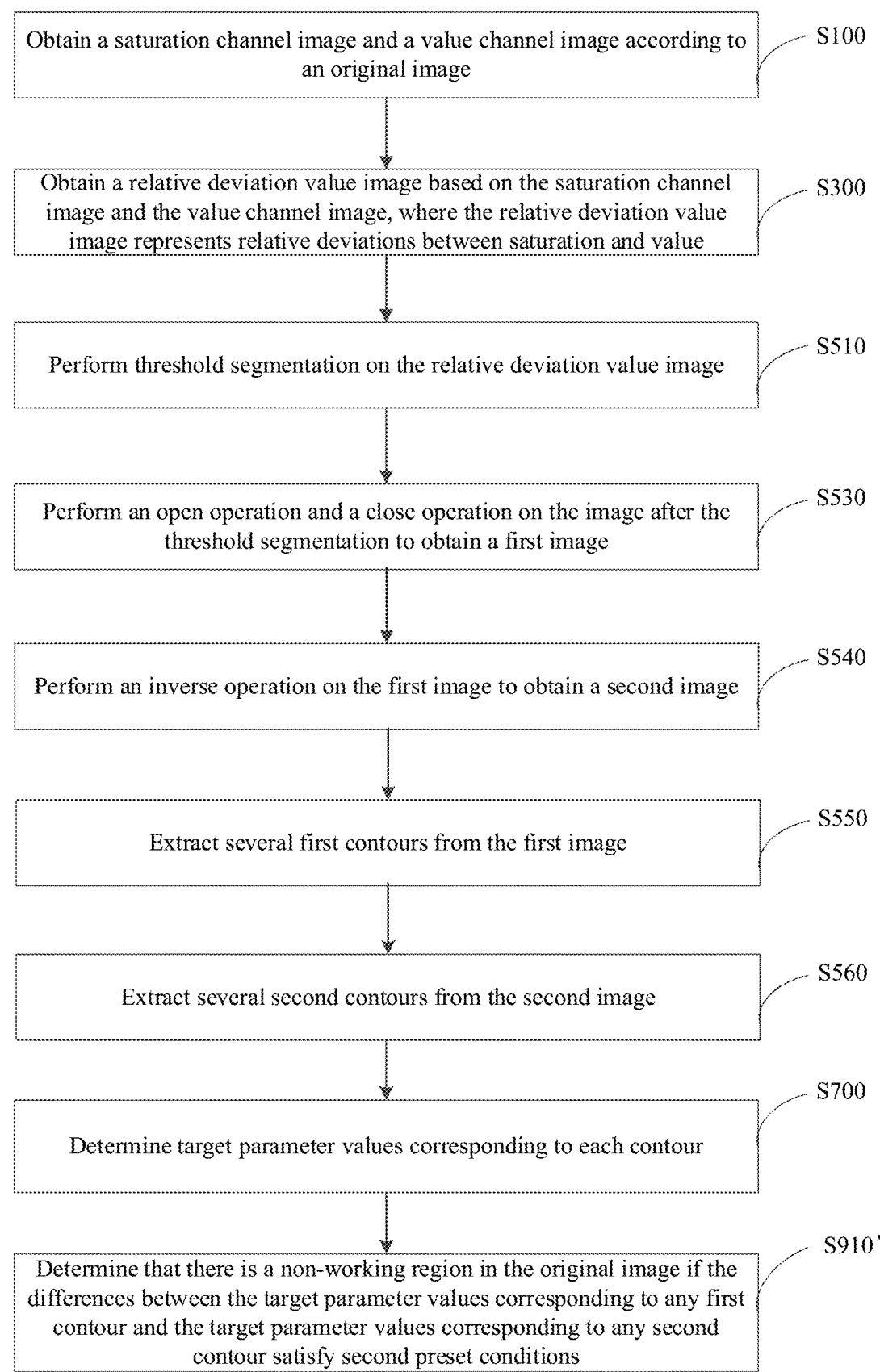

| Obtain a saturation channel image and a value channel image according to an original image | S100 |

Obtain a relative deviation value image based on the saturation channel image and the value channel image, where the relative deviation value image represents relative deviations between saturation and value — S300

Perform threshold segmentation on the relative deviation value image — S510

Perform an open operation and a close operation on the image after the threshold segmentation to obtain a first image — S530

Perform an inverse operation on the first image to obtain a second image — S540

Extract several first contours from the first image — S550

Extract several second contours from the second image — S560

Determine target parameter values corresponding to each contour — S700

Determine that there is a non-working region in the original image if the differences between the target parameter values corresponding to any first contour and the target parameter values corresponding to any second contour satisfy second preset conditions — S910'

FIG. 5

First obtaining module ⌐ 100

Second obtaining module ⌐ 300

Contour extraction module ⌐ 500

First determination module ⌐ 700

Second determination module ⌐ 900

IMAGE ANALYSIS METHOD AND APPARATUS, COMPUTER DEVICE, AND READABLE STORAGE MEDIUM

CROSS-REFERENCE TO RELATED PATENT APPLICATIONS

This application claims benefit of Chinese Application No. 202210846907.4, filed on Jul. 19, 2022, which is incorporated by reference herein.

TECHNICAL FIELD

The present application relates to the field of image processing technology, and in particular, to an image analysis method and apparatus, a computer device, and a readable storage medium.

BACKGROUND

With the development of technology, existing intelligent devices already can integrate image analysis technology, which improves the intelligence and convenience of use of the intelligent devices.

An intelligent lawn mower is used as an example. The intelligent lawn mower collects image information of the ground in real time during travel, and then analyzes and processes collected images to recognize lawn regions and non-lawn regions (such as cement land), so as to accurately move to the lawn regions and clean the lawn regions. However, the existing image analysis technology is not yet perfect, and often cannot effectively recognize the non-lawn regions. As a result, the intelligent lawn mower may move to the non-lawn regions, the working efficiency of the intelligent lawn mower is reduced, and even the intelligent lawn mower collides with obstacles and is damaged.

Similarly, other intelligent devices with image collection and analysis functions may also be unable to effectively recognize non-working regions when working.

SUMMARY

Based on this, it is necessary to provide an image analysis method, an image analysis apparatus, a computer device, and a computer-readable storage medium for the above problems.

According to a first aspect of embodiments of the present application, an image analysis method is provided, including:

obtaining a saturation channel image and a value channel image according to an original image;

obtaining a relative deviation value image based on the saturation channel image and the value channel image, where the relative deviation value image represents relative deviations between saturation and value;

extracting several contours from the relative deviation value image;

determining target parameter values corresponding to each contour; and determining, according to analysis results of the target parameter values corresponding to each contour, whether there is a non-working region in the original image.

In one embodiment, in the obtaining a relative deviation value image based on the saturation channel image and the value channel image, obtaining the relative deviation value image by using the following formula:

$$dMat = \frac{sMat - vMat}{sMat + vMat} * 255$$

where dMat is the relative deviation value image, sMat is the saturation channel image, and vMat is the value channel image.

In one embodiment, the target parameter values include any of contour width, contour height, contour diagonal, quantity of pixels contained in a contour, contour coordinates, proportion of valid pixel values, average saturation, average relative deviation value, quantity of low saturation pixels, average brightness roughness, average brightness value, average hue value, average hue roughness, and peak of pixel quantity.

In one embodiment, the determining target parameter values corresponding to each contour includes:

converting the original image into an HSV image;

performing color segmentation on the HSV image by combining a hue channel threshold, a saturation channel threshold, and a value channel threshold to obtain a target image;

obtaining a quantity of green pixels in the target image; and determining a proportion of valid pixel values by combining the quantity of green pixels in the target image and a quantity of pixels contained in the contour.

In one embodiment, the determining target parameter values corresponding to each contour further includes:

determining the quantity of low saturation pixels according to the saturation channel image;

pre-processing the saturation channel image to obtain a pre-processed image;

determining a saturation according to the pre-processed image; and determining the average saturation by combining the saturation and the quantity of pixels contained in the contour.

In one embodiment, the determining target parameter values corresponding to each contour further includes:

pre-processing the relative deviation value image;

determining a relative deviation value according to the pre-processed image; and determining an average relative deviation value according to the relative deviation value and the quantity of pixels contained in the contour.

In one embodiment, the determining target parameter values corresponding to each contour further includes:

pre-processing the value channel image;

determining a brightness value according to the pre-processed image, and determining an average brightness value based on the brightness value and the quantity of pixels contained in the contour; and performing edge extraction on the pre-processed image to obtain an edge image, determining a brightness roughness according to the edge image, and determining an average brightness roughness according to the brightness roughness and the quantity of pixels contained in the contour.

In one embodiment, the image analysis method further includes a obtaining a hue channel image according to the original image; and the determining target parameter values corresponding to each contour further includes:

determining a peak of pixel quantity and a hue value according to the hue channel image;

determining the average hue value according to the hue value and the quantity of pixels contained in the contour;

pre-processing the hue channel image; and performing edge extraction on the pre-processed image to obtain an edge image, determining a hue roughness according to the edge image, and determining the average hue roughness according to the hue roughness and the quantity of pixels contained in the contour.

In one embodiment, the extracting several contours from the relative deviation value image includes:

performing threshold segmentation on the relative deviation value image to obtain a threshold segmentation image;

performing an open operation and a close operation on the threshold segmentation image after the threshold segmentation to obtain a first image; and extracting several first contours from the first image.

In one embodiment, the determining, according to analysis results of the target parameter values corresponding to each contour, whether there is a non-working region in the original image includes:

determining that there is the non-working region in the original image if the target parameter values corresponding to any first contour satisfy first preset conditions, where the first preset conditions include:

the average hue value is greater than a first hue value, the average hue roughness is less than a preset hue roughness, the average brightness roughness is less than a first brightness roughness, the proportion of valid pixel values is less than a first proportion, the average brightness value is greater than a first brightness value, the peak of pixel quantity is greater than a first quantity of pixels, an abscissa of a lower right vertex in contour coordinates is greater than a first abscissa value, and the quantity of pixels contained in the contour is less than a second quantity of pixels.

In one embodiment, after the obtaining a first image, the image analysis method further includes:

performing an inverse operation on the first image to obtain a second image; and extracting several second contours from the second image;

the determining, according to analysis results of the target parameter values corresponding to each contour, whether there is a non-working region in the original image includes:

determining that there is the non-working region in the original image if differences between the target parameter values corresponding to any first contour and the target parameter values corresponding to any second contour satisfy second preset conditions.

In one embodiment, the second preset conditions include:

a diagonal of the first contour is greater than a preset value, an ordinate of a lower right vertex of the first contour is greater than a first ordinate value, an ordinate of an upper left vertex of the first contour is less than a second ordinate value, the proportion of valid pixel values of the first contour is less than a second proportion, the average brightness roughness of the first contour is greater than a second brightness roughness, the average brightness value of the first contour is greater than a second brightness value, the average brightness value of the second contour is greater than a third brightness value, a difference between the average relative deviation values of the first contour and the second contour is greater than a first difference, a difference between the average saturations of the second contour and the first contour is greater than a preset saturation difference, and the quantity of low saturation pixels is within a preset pixel quantity range;

or, the second preset conditions include:

the average hue value of the first contour is greater than a second hue value, a difference between the average hue values of the first contour and the second contour is greater than a first hue difference, the peak of pixel quantity is greater than a third quantity of pixels, the ratio of the average brightness roughness of the first contour and the second contour is less than a first preset ratio, and a difference between the average brightness values of the first contour and the second contour is greater than a first brightness difference;

or, the second preset conditions include:

the contour height of the first contour is greater than a preset height, the abscissa of the lower right vertex of the first contour is greater than a second abscissa value, the quantity of pixels contained in the first contour is greater than a fourth quantity of pixels, the proportion of valid pixel values of the first contour is less than a third proportion, the average brightness roughness of the first contour is less than a third brightness roughness, the average brightness value of the first contour is within a preset brightness range, a difference between the average brightness values of the second contour and the first contour is less than a second brightness difference, the average brightness value of the second contour is less than a fourth brightness value, the average relative deviation value of the first contour and the second contour is greater than a second difference, the absolute value of a difference between the average hue values of the second contour and the first contour is greater than a second hue difference, and the peak of pixel quantity is greater than a fifth quantity of pixels;

or, the second preset conditions include:

a difference between the average brightness values of the second contour and the first contour is greater than a third brightness difference, the average brightness roughness of the first contour and the second contour are less than a fourth brightness roughness, the peak of pixel quantity is greater than a sixth quantity of pixels, the proportion of valid pixel values of the first contour is less than a fourth proportion, a difference between the average hue values of the first contour and the second contour is greater than a third hue difference, and the ratio of the average brightness roughness of the first contour and the second contour is less than a second preset ratio.

According to a second aspect of the embodiments of the present application, an image analysis apparatus is provided, including:

a first obtaining module, configured to obtain a saturation channel image and a value channel image according to an original image;

a second obtaining module, configured to obtain a relative deviation value image based on the saturation channel image and the value channel image, where the relative deviation value image represents relative deviations between saturation and value;

a contour extraction module, configured to extract several contours from the relative deviation value image;

a first determination module, configured to determine target parameter values corresponding to each contour; and a second determination module, configured to determine, according to analysis results of the target parameter values corresponding to each contour, whether there is a non-working region in the original image.

According to a third aspect of the embodiments of the present application, a computer device is provided, including a memory and a processor, the memory storing a computer program, and the processor implementing the foregoing image analysis method when executing the computer program.

According to a fourth aspect of the embodiments of the present application, a computer-readable storage medium is provided, storing a computer program, the foregoing image analysis method being implemented when the computer program is executed by a processor.

According to the image analysis method and apparatus, the computer device, and the readable storage medium provided in the embodiments of the present application, a saturation channel image and a value channel image are first obtained according to an original image, then a relative deviation value image is obtained based on the saturation channel image and the value channel image, several contours are extracted from the relative deviation value image, target parameter values corresponding to each contour are determined, and whether there is a non-working region in the original image is finally determined according to analysis results of the target parameter values corresponding to each contour. There are certain differences between relative deviation values of saturation and value of working regions and non-working regions, and this embodiment may use this characteristic to segment several contours from the relative deviation value image, then analyze parameters of each contour by combining the characteristics or differences of working regions and non-working regions, and recognize one by one whether there is a non-working region in each contour, thereby effectively reducing missing determination of non-working regions in the image, recognizing non-working regions in the image more accurately, and improving the efficiency and safety of an intelligent device.

BRIEF DESCRIPTION OF THE DRAWINGS

FIG. 1 is a flow block diagram of an image analysis method provided in an embodiment of the present application;

FIG. 2 is a flow block diagram of an image analysis method provided in another embodiment of the present application;

FIG. 5 is a flow block diagram of an image analysis method provided in still another embodiment of the present application;

DETAILED DESCRIPTION OF THE EMBODIMENTS

Figure 3:
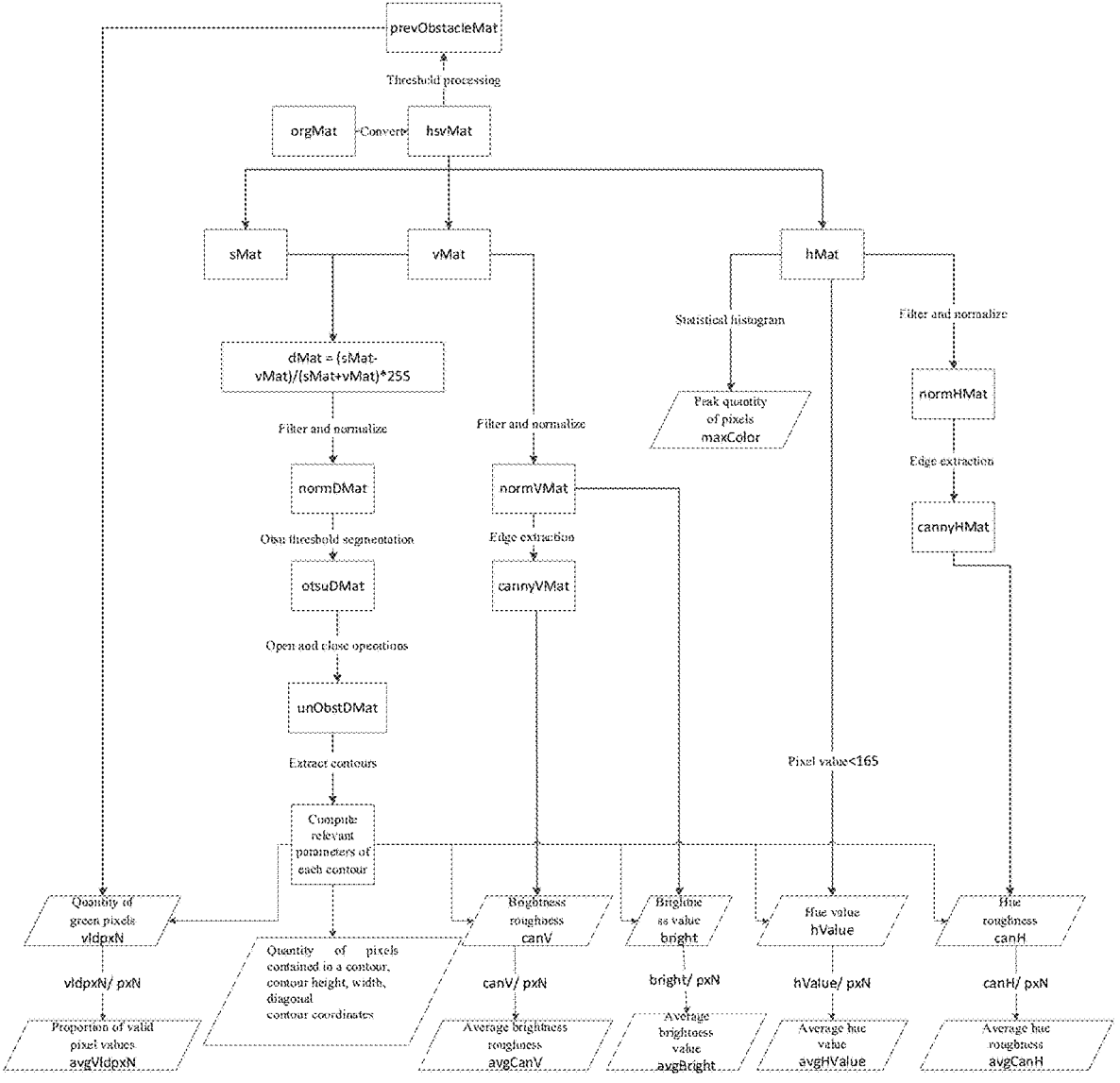
FIG. 3 is a flow block diagram of a specific example of the present application.

In order to facilitate the understanding of the present application, the present application will be described more comprehensively below with reference to the relevant accompanying drawings. Preferred embodiments of the present application are shown in the drawings. However, the present application may be implemented in many different forms, and is not limited to the embodiments described herein. On the contrary, these embodiments are provided for a more thorough and comprehensive understanding of the disclosure of the present application.

In the present application, unless otherwise specified and limited, the terms "mounted", "connected", "connection", "fixed", and the like should be understood broadly. For example, the "connection" may be a fixed connection, a detachable connection, an integration, a mechanical connection, an electrical connection, a direct connection, an indirect connection through a medium, or an internal communication of two elements, or an interaction between two elements. Those of ordinary skill in the art may understand the specific meanings of the above terms in the present application according to specific circumstances.

The terms "first" and "second" are merely for the sake of description, and cannot be understood as indicating or implying the relative importance or implicitly indicating the quantity of the indicated technical features. Therefore, the features defined by the terms "first" and "second" may explicitly or implicitly include at least one of these features. In the description of the present application, the meaning of "plurality" is at least two, for example two or three, unless otherwise specifically defined.

Unless otherwise defined, all technical and scientific terms used herein have the same meanings as commonly understood by those of ordinary skill in the technical field of the present application. The terms used in the description of the present application are only for the purpose of describing specific embodiments, but are not intended to limit the present application. The term "and/or" used herein includes any and all combinations of one or more relevant listed items.

As mentioned in the background, the image analysis technology, as a key technology, has been widely used in various intelligent devices. An intelligent lawn mower is used as an example. The intelligent lawn mower may collect image information of the ground in real time during travel, and then analyze and process the image information to recognize lawn regions and non-lawn regions (such as cement land or stone floor), so as to move to the lawn regions for cleaning.

However, the existing image analysis technology is not yet perfect and often cannot effectively and accurately recognize the non-lawn regions, that is, mistakenly recognizes non-lawn regions as lawn regions. As a result, the intelligent lawn mower moves to the non-lawn regions for cleaning, which reduces the working efficiency of the intelligent lawn mower. On the other hand, if there are obstacles in the non-lawn regions, the intelligent lawn mower may be damaged due to collision with the obstacles. Similarly, other intelligent devices with image collection and analysis functions may also be unable to effectively recognize non-working regions when working.

Thus, embodiments of the present application provide an image analysis method, an image analysis apparatus, a computer device, and a computer-readable storage medium for effectively recognizing non-working regions in images to improve working efficiency and safety of an intelligent device.

In one embodiment, an image analysis method is provided. The image analysis method may be used for recognizing a non-working region from a captured image. Hereinafter, a lawn mower is used as an example for explanation, that is, the working region is a lawn region, and the non-working region is a non-lawn region.

With reference to FIG. 1, an image analysis method provided in this embodiment includes the following steps:

Step S100: Obtain a saturation channel image and a value channel image according to an original image.

Images are captured through a capture device. When an image is captured, the captured image is obtained from the capture device. In this embodiment of the present application, the image is defined as the original image, and the original image may include a lawn region and a non-lawn region. The image has multiple characteristics, such as saturation, hue, and value, each of which has a corresponding channel image. In this embodiment, the original image may be processed correspondingly to obtain the saturation channel image and the value channel image for subsequent processing.

Step S300: Obtain a relative deviation value image based on the saturation channel image and the value channel image, where the relative deviation value image represents relative deviations between saturation and value.

After the saturation channel image and the value channel image are obtained, a deviation value between saturation and value at each position in the image may be obtained by computation, and then an image representing relative deviation values may be obtained. In this embodiment, the image is defined as the relative deviation value image.

Step S500: Extract several contours from the relative deviation value image.

Due to differences in relative deviation values between lawn regions and non-lawn regions, this feature may be used to segment the relative deviation value image, so as to extract the several contours.

Step S700: Determine target parameter values corresponding to each contour.

After the contours are extracted, the target parameter values of each contour may be determined one by one. The target parameter values may be parameter values of features that reflect whether there is a non-lawn region in the contour, for example, a proportion of valid pixel values, a brightness related value, and an average relative deviation value. Moreover, due to great differences between lawn and non-lawn regions, if both lawn and non-lawn regions exist in the image, the characteristics of the target parameter values corresponding to each contour and differences between the target parameter values of contours may be used as important criteria for determining whether there is a non-lawn region, for example, an average hue value, a proportion of valid pixel values, an average brightness value, and the like of a single contour, or a difference between average relative deviation values of two contours, a difference between average hue values of the two contours, a difference between average brightness values of the two contours, and the like. In practical applications, target parameters may be determined based on actual needs, and values of the target parameters may be obtained. The target parameters selected in this embodiment may be referred to subsequent specific descriptions.

In this embodiment, the target parameter values corresponding to each contour may be determined by combining the relative deviation value image, the saturation channel image, the value channel image, and a hue channel image, that is, the target parameter values of each contour are determined by combining features of multiple dimensions such as saturation, value, hue, and relative deviation between saturation and value, thereby improving the accuracy of subsequent determination of a non-lawn region based on the target parameter values.

Step S900: Determine, according to analysis results of the target parameter values corresponding to each contour, whether there is a non-working region in the original image.

Because each contour is segmented based on differences between relative deviation values of saturation and brightness, if there is a non-lawn region in the image, each contour has actually preliminarily distinguished the lawn from the non-lawn region. On this basis, non-lawn regions may be further recognized by combining the characteristics or differences of the target parameter values corresponding to each contour. If there is a non-lawn region, the target parameter values of the contour where the non-lawn region is located conform to certain laws, or differences between the target parameter values of the contour and the target parameter values of other contour that include only lawn regions theoretically conform to certain laws. This embodiment may analyze the target parameter values of each contour based on the laws to determine whether there is a non-lawn region in the original image.

The contours of the relative deviation value image are segmented in advance according to differences between relative deviation values of saturation and brightness, which is equivalent to preliminary segmentation of lawn regions and potential non-lawn regions, and then the parameters of each contour are further analyzed by combining the characteristics or differences of contours, thereby improving recognition accuracy of non-lawn regions and avoid missing recognition of non-lawn regions.

In practical applications, there may be a non-lawn region in each extracted contour. As long as there is a non-lawn region in any contour, it may be considered that there is a non-lawn region in the image, and the position of the non-lawn region in the image may be determined, so that the lawn mower avoids the non-lawn region during travel.

According to the image analysis method provided in this embodiment, a saturation channel image and a value channel image are first obtained according to an original image, then a relative deviation value image is obtained based on the saturation channel image and the value channel image, several contours are extracted from the relative deviation value image, target parameter values corresponding to each contour are determined, and whether there is a non-working region in the original image is finally determined according to analysis results of the target parameter values corresponding to each contour. There are certain differences between relative deviation values of saturation and value of working regions and non-working regions, and this embodiment may use this characteristic to segment several contours from the relative deviation value image, then analyze parameters of each contour by combining the characteristics or differences of working regions and non-working regions, and recognize one by one whether there is a non-working region in each contour, thereby effectively reducing missing determination of non-working regions in the image, recognizing non-lawn regions in the image more accurately, and improving the efficiency and safety of an intelligent device.

In this embodiment, the original image captured by a capture device such as a camera is usually in an RGB format. In step S100, the image in the RGB format may be first converted into an image in an HSV format (referred to as an HSV image), and then the HSV image is separated to obtain the saturation channel image and the value channel image.

The HSV format is a color space, including a hue H, a saturation S, and a value V. The hue H is measured by an angle, with a value range of 0°-180°; the saturation S represents a degree to which the color is close to a spectral color, a larger proportion of the spectral color indicates a higher degree to which the color is close to the spectral color and a higher saturation of the color, and a value range of the saturation S is 0%-100%; and the value V represents a degree of brightness of the color, the value V is related to the transmittance or reflectance of an object for an object color, and a value range of the value V is 0%-100%, where 0% represents black and 100% represents white. In this embodiment, after the HSV image is separated, a saturation channel image, a value channel image, and a hue channel image may be obtained simultaneously. In the current step, only the saturation channel image and the value channel image are required.

In one embodiment, in step S300, namely, in the obtaining a relative deviation value image based on the saturation channel image and the value channel image, obtaining the relative deviation value image by using the following formula:

$$dMat = \frac{sMat - vMat}{sMat + vMat} * 255$$

where dMat is the relative deviation value image, sMat is the saturation channel image, and vMat is the value channel image.

The relative deviation value between saturation and brightness at each position may be computed through the above formula. Due to a difference between the relative deviation values of a lawn and a non-lawn, the relative deviation value image may be segmented subsequently based on this difference. If there is a non-lawn region, the non-lawn and the lawn may be pre-segmented.

In one embodiment, the target parameter values include any of contour width, contour height, contour diagonal, quantity of pixels contained in a contour, contour coordinates, proportion of valid pixel values, average saturation, average relative deviation value, quantity of low saturation pixels, average brightness roughness, average brightness value, average hue value, average hue roughness, and peak of pixel quantity.

In practical applications, any of the foregoing target parameters may be selected as determination parameters based on needs. In addition, the target parameters used for different analysis methods may also differ.

In one embodiment, step S700, namely, the determining target parameter values corresponding to each contour, includes:

Step S710*a*: Convert the original image into an HSV image;

Step S720*a*: Perform color segmentation on the HSV image by combining a hue channel threshold, a saturation channel threshold, and a value channel threshold to obtain a target image;

Step S730*a*: Obtain a quantity of green pixels in the target image; and

Step S740*a*: Determine a proportion of valid pixel values by combining the quantity of green pixels in the target image and a quantity of pixels contained in the contour.

The foregoing process is a specific process of determining the proportion of valid pixel values. After the target image is obtained, the quantity of green pixels therein may be obtained. In this embodiment, the green pixels are valid pixels, and the proportion of valid pixel values in each image contour may be determined by combining the quantity of green pixels and the quantity of pixels contained in each image contour. Generally, the non-lawn region has a relatively low proportion of valid pixel values. Therefore, the proportion of valid pixel values may be used as an important factor to determine whether there is a non-lawn region.

In one embodiment, step S700, namely, the determining target parameter values corresponding to each contour, further includes:

Step S710*b*: Determine the quantity of low saturation pixels according to the saturation channel image.

In this embodiment, pixels with pixel values less than a given value are defined as low saturation pixels. For example, pixels with pixel values less than 38 may be defined as low saturation pixels. That is, the number of pixels with pixel values less than 38 in the saturation channel image, namely, the quantity of low saturation pixels, may be determined.

Step S720*b*: Pre-process the saturation channel image.

The pre-processing includes filtering and normalization, which may reduce interference signals in the saturation channel image, so as to improve the accuracy of subsequent analysis processes.

Step S730*b*: Determine a saturation according to the pre-processed image.

The pre-processed image is a gray image with a pixel value range of 0-255. In this embodiment, an accumulated value of pixel values of pixels in the image is used as the overall saturation.

Step S740*b*: Determine the average saturation by combining the saturation and the quantity of pixels contained in the contour.

In this embodiment, the average saturation of each contour may be obtained by dividing the saturation by the quantity of pixels contained in each contour.

In one embodiment, step S700, namely, the determining target parameter values corresponding to each contour, further includes:

Step S710*c*: Pre-process the relative deviation value image.

The pre-processing includes filtering and normalization.

Step S720*c*: Determine a relative deviation value according to the pre-processed image.

The pre-processed image is a gray image with a pixel value range of 0-255. In this embodiment, an accumulated value of pixel values of pixels in the image is used as the relative deviation value.

Step S730*c*: Determine an average relative deviation value according to the relative deviation value and the quantity of pixels contained in the contour.

In this embodiment, a result of the relative deviation value divided by the quantity of pixels contained in each contour may be used as the average relative deviation value of each contour.

In one embodiment, step S700, namely, the determining target parameter values corresponding to each contour, further includes:

Step S710*d*: Pre-process the value channel image.

The pre-processing includes filtering and normalization. This may reduce interference signals in the value channel image, so as to improve the accuracy of subsequent analysis processes.

Step S720d: Determine a brightness value according to the pre-processed image, and determine an average brightness value according to the brightness value and the quantity of pixels contained in the contour.

The pre-processed image is a gray image with a pixel value range of 0-255. In this embodiment, an accumulated value of pixel values of pixels in the image is used as the brightness value, and the brightness value is divided by the quantity of pixels contained in each contour to obtain the average brightness value of each contour.

Step S730d: Perform edge extraction on the pre-processed image to obtain an edge image, determine a brightness roughness according to the edge image, and determine an average brightness roughness according to the brightness roughness and the quantity of pixels contained in the contour.

The edge extraction may be further performed on the pre-processed image by using a canny edge detection operator and the like. The edge image is a binary image, with a pixel value not 0 but 255. The brightness roughness is an accumulated number of edge pixels, and the average brightness roughness of each contour may be a result of the brightness roughness divided by the quantity of pixels contained in each contour.

In one embodiment, the image analysis method provided in this embodiment further includes obtaining a hue channel image according to the original image. The hue channel image, the saturation channel image, and the value channel image may be obtained synchronously.

Step S700, namely, the determining target parameter values corresponding to each contour, further includes:

Step S710e: Determine a peak of pixel quantity and a hue value according to the hue channel image.

Step S720e: Determine the average hue value according to the hue value and the quantity of pixels contained in the contour.

After the hue channel image is obtained, statistics on a corresponding histogram, namely, a hue histogram, may be collected. The horizontal axis of the hue histogram represents a hue distribution range, and the vertical axis represents a quantity of pixels contained in each hue, namely, a quantity of pixels. A maximum quantity of pixels, namely, the peak of pixel quantity, may be determined through the hue histogram.

The hue channel image is a gray image with a pixel value range of 0-180. In this embodiment, pixel values less than 165 may be filtered out, and an accumulated result of all pixel values less than 165 may be used as the hue value. A computational result of dividing the hue value by the quantity of pixels contained in each contour may be used as the average hue value of each contour.

Step S730e: Pre-process the hue channel image.

The pre-processing includes filtering and normalization, which may reduce interference signals in the saturation channel image, so as to improve the accuracy of subsequent analysis processes.

Step S740e: Perform edge extraction on the pre-processed image to obtain an edge image, determine a hue roughness according to the edge image, and determine the average hue roughness according to the hue roughness and the quantity of pixels contained in the contour.

The edge extraction may be further performed on the pre-processed image by using a canny edge detection operator and the like. The edge image is a binary image, with a pixel value not 0 but 255. The hue roughness is an accumulated number of edge pixels, and the average hue roughness of each contour may be a result of the hue roughness divided by the quantity of pixels contained in each contour.

Mass captured images are used as the basis of data analysis, and image features of contours in the presence and absence of non-lawn regions and differences between the two may be obtained. In this embodiment, preset conditions may be determined in advance according to the image features and differences obtained above, so as to serve as references for the presence of non-lawn regions in practical application scenarios.

With reference to FIG. 2, in one embodiment, step S500, namely, the extracting several contours from the relative deviation value image, includes:

Step S510: Perform threshold segmentation on the relative deviation value image.

In this embodiment, a foreground and a background of the relative deviation value image may be segmented. Specifically, an Otsu threshold method or other algorithms that may implement the same function may be used for the threshold segmentation.

In practical applications, before the threshold segmentation on the relative deviation value image, the relative deviation value image may be pre-processed, where the pre-processing includes filtering and normalization. This may reduce interference signals in the relative deviation value image, so as to improve the accuracy of subsequent analysis processes.

Step S530: Perform an open operation and a close operation on the image after the threshold segmentation to obtain a first image.

The open operation generally refers to smoothing the contour of an object, breaking narrow necks, and eliminating small protrusions. The close operation generally also refers to smoothing the contour of the object, closing narrow gaps and elongated grooves, eliminating small spaces, and filling fractures in contour lines. In this embodiment, the open operation and the close operation performed on the image obtained after the threshold segmentation may smooth the contours in the image, break narrow necks, eliminate small protrusions, close narrow gaps and elongated grooves, eliminate small spaces, and fill fractures in the contour lines to obtain a smoother first image, which facilitates subsequent contour extraction.

Step S550: Extract several first contours from the first image.

After the first image is obtained, contour detection may be performed on the first image, and several first contours may be extracted from the first image.

In one embodiment, step S900, namely, the determining, according to analysis results of the target parameter values corresponding to each contour, whether there is a non-working region in the original image includes:

Step S910: Determine that there is the non-working region in the original image if the target parameter values corresponding to any first contour satisfy first preset conditions.

The first preset conditions represent determination conditions that there is a non-lawn region in the first contour, and may be value distribution characteristics of the target parameter values corresponding to the non-lawn region. After the several first contours are obtained, traversal analysis may be performed on the target parameter values corresponding to each first contour to determine whether they satisfy the first preset conditions. If the target parameter values corresponding to a first contour satisfy the first preset conditions, it is determined that there is a non-lawn region in the first contour, that is, there is a non-lawn region in the image.

In one embodiment, the first preset conditions include:

the average hue value is greater than a first hue value, the average hue roughness is less than a preset hue roughness, the average brightness roughness is less than a first brightness roughness, the proportion of valid pixel values is less than a first proportion, the average brightness value is greater than a first brightness value, the peak of pixel quantity is greater than a first quantity of pixels, an abscissa of a lower right vertex in contour coordinates is greater than a first abscissa value, and the quantity of pixels contained in the contour is less than a second quantity of pixels.

Mass captured images are used as the basis of data analysis, image features of each contour in the presence of a non-lawn region, such as low proportion of valid pixel values and low average brightness roughness, may be obtained, and the foregoing first preset conditions set on this basis are more accurate.

In one embodiment, in the first preset conditions, the first hue value includes 80, the preset hue roughness includes 0.1, the first brightness roughness includes 0.11, the first proportion includes 0.85, the first brightness value includes 80, the first quantity of pixels includes 600, the first abscissa value includes 157, and the second quantity of pixels includes 8500.

Of course, the foregoing thresholds are not unique and may be determined based on actual situations, as long as the preset conditions conform to the characteristics reflected in the contour of the non-lawn region.

Further, it should be noted that the first preset conditions further include limitations on a contour width or a contour height. Before whether the target parameters satisfy the conditions is determined, whether the contour width or the contour height reaches a standard is first determined, and if so, other target parameters may be analyzed, otherwise, subsequent analysis may not be performed on the image contour. For example, if the contour width is greater than 85 or the contour height is greater than 70, it is considered that the contour is valid and subsequent analysis may be performed. If the contour width does not reach 85 and the contour height also does not reach 70, it is considered that the contour is invalid and ignored.

Figure 4A:
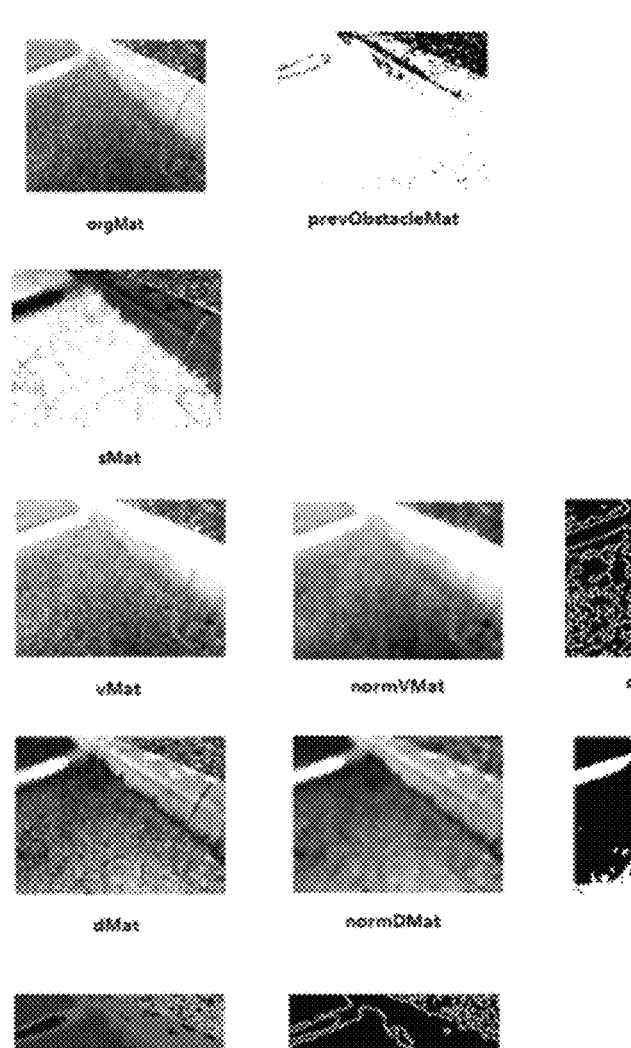
FIGS. 4A and 4B are schematic diagrams of each image obtained in a specific example of the present application.

The image analysis method provided in this embodiment will be explained with a specific example with reference to FIG. 3 and FIGS. 4A and 4B:

First, an original image orgMat is obtained and converted into an HSV image hsvMat, which is then separated into a saturation channel image sMat, a hue channel image hMat, and a value channel image vMat (see FIG. 4A).

Color segmentation is performed on the HSV image through a hue channel threshold, a value channel threshold, and a saturation channel threshold to obtain a target image prevObstacleMat (see FIG. 4A).

A relative deviation value image dMat is obtained according to the saturation channel image sMat and the value channel image vMat (see FIG. 4A).

Figure 4B:
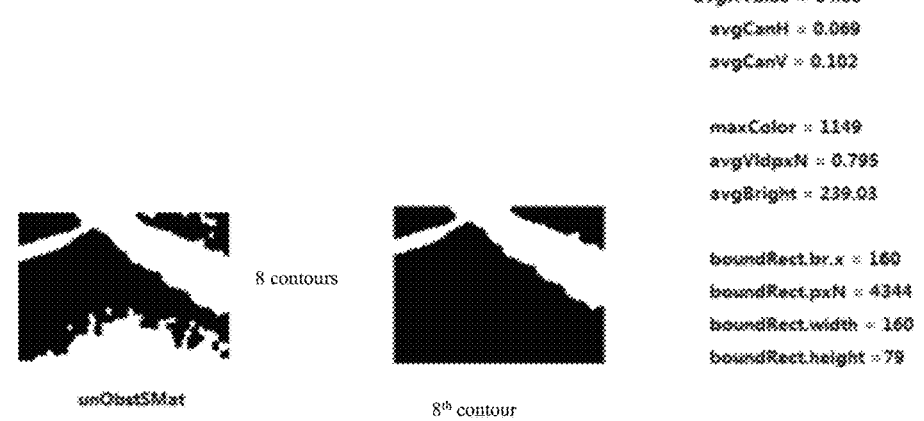

With reference to FIGS. 4A and 4B, the relative deviation value image dMat is filtered and normalized to obtain an image normDMat, Otsu threshold segmentation is performed on the image normDMat to obtain an image otsuD-Mat, an open operation and a close operation are performed on the image otsuDMat to obtain an image unObstDMat, contour detection is performed on the image unObstDMat to extract several first contours, and statistics on the width boundRect.width, height boundRect.height, diagonal boundRect.diagonal, coordinates, and quantity of pixels pxN of each first contour are collected.

With reference to FIG. 4A, the value channel image vMat is filtered and normalized to obtain an image normVMat, and edge extraction is performed on the image normVMat to obtain an image cannyVMat. A brightness value bright is determined according to the image normVMat and divided by the quantity of pixels pxN of each first contour to compute an average brightness value avgBright of each first contour, and a brightness roughness canV is determined according to the image cannyVMat and then divided by the quantity of pixels pxN of each contour to compute an average brightness roughness avgCanV of each first contour.

A peak of pixel quantity maxColor is determined according to a hue histogram corresponding to the hue channel image hMat, and pixel values less than 165 are accumulated to obtain a hue value hValue, which is then divided by the quantity of pixels pxN of each contour to compute an average hue value avgHValue of each first contour.

The hue channel image hMat is filtered and normalized to obtain an image normHMat, edge extraction is performed on the image normHMat to obtain an image cannyHMat, and a hue roughness canH is determined according to the image cannyHMat and divided by the quantity of pixels pxN of each contour to compute an average hue roughness avgCanH of each first contour.

A quantity of green pixels vldpxN is determined according to the target image prevObstacleMat, and then divided by the quantity of pixels pxN of each contour to compute a proportion of valid pixel values avgVldpxN of each contour.

In this example, the first preset conditions are: the average hue value is greater than 80, the average hue roughness is less than 0.1, the average brightness roughness is less than 0.11, the proportion of valid pixel values is less than 0.85, the average brightness value is greater than 80, the peak of pixel quantity is greater than 600, the abscissa of the lower right vertex in the contour coordinates is greater than 157, and the quantity of pixels contained in the contour is less than 8500.

With reference to FIG. 4B, the analysis results show 8 first contours.

Regarding the 8th First Contour:

The average hue value avgHValue=84.05, the average hue roughness avgCanH=0.069, the average brightness roughness avgCanV=0.102, the proportion of valid pixel values avgVldpxN=0.795, the average brightness value avgBright=239.03, the peak quantity of pixel values maxColor=1149, the abscissa of the lower right vertex in the contour coordinates boundRect.br.x=160, the quantity of pixels contained in the contour boundRect.pxN=4344, the contour width boundRect.width=160, and the contour height boundRect.height=79.

After analysis, it may be determined that the target parameter values of the 8th first contour satisfy the first preset conditions, there is a non-lawn region in the 8th first contour, and there is a non-lawn region in the currently obtained original image.

With reference to FIG. 5, in one embodiment, after step S530, namely, after the obtaining the first image, step S500, namely, the extracting several contours from the relative deviation value image, further includes:

Step S540: Perform an inverse operation on the first image to obtain a second image.

After the first image is obtained, the inverse operation may be performed on the first image, that is, pixels in the image are turned into inverse colors, and the inverted image is used as the second image for subsequent contour extraction from the second image.

Step S560: Extract several second contours from the second image.

After the second image is obtained, contour detection may be performed on the second image to extract the several second contours from the second image. Thus, the first contours and the second contours may be obtained. Subsequently, the first contours and the second contours may be traversed, compared, and analyzed to recognize non-lawn regions by using differences between the first contours and the second contours and respective image features.

In one embodiment, step S900, namely, the determining, according to analysis results of the target parameter values corresponding to each contour, whether there is a non-working region in the original image includes:

Step S910': Determine that there is the non-working region in the original image if differences between the target parameter values corresponding to any first contour and the target parameter values corresponding to any second contour satisfy second preset conditions.

In practical applications, the first contours and the second contours may be compared in pairs. When differences between the target parameter values corresponding to two contours are compared, if differences satisfy the second preset conditions, it may be determined that one of the current two contours contains a non-lawn region, and an approximate position of the non-lawn region in the original image may be determined, which is conducive to controlling the lawn mower to avoid working in the non-lawn region.

In this embodiment, the second preset conditions may include a difference between the average relative deviation values of two different contours exceeding a value, a difference between the average hue values of two different contours exceeding a value, or the like, as long as the preset conditions can reflect a difference between a non-lawn region and a lawn region. Alternatively, the recognition may combine the characteristics of respective contours, such as average hue value, average brightness value, and average brightness roughness in the contours, thereby improving the accuracy of recognition.

In one embodiment, the second preset conditions may include:

A diagonal of the first contour is greater than a preset value, an ordinate of a lower right vertex of the first contour is greater than a first ordinate value, an ordinate of an upper left vertex of the first contour is less than a second ordinate value, the proportion of valid pixel values of the first contour is less than a second proportion, the average brightness roughness of the first contour is greater than a second brightness roughness, the average brightness value of the first contour is greater than a second brightness value, the average brightness value of the second contour is greater than a third brightness value, a difference between the average relative deviation values of the first contour and the second contour is greater than a first difference, a difference between the average saturations of the second contour and the first contour is greater than a preset saturation difference, and the quantity of low saturation pixels is within a preset pixel quantity range.

The preset value may include 110, the first ordinate value may include 65, the second ordinate value may include 10, the second proportion may include 0.35, the second brightness roughness may include 0.17, the second brightness value may include 105, the third brightness value may include 95, the first difference may include 70, the preset saturation difference may include 28, and the preset pixel quantity range may include 1800-4000.

Or, the second preset conditions include:

The average hue value of the first contour is greater than a second hue value, a difference between the average hue values of the first contour and the second contour is greater than a first hue difference, the peak of pixel quantity is greater than a third quantity of pixels, the ratio of the average brightness roughness of the first contour and the second contour is less than a first preset ratio, and a difference between the average brightness values of the first contour and the second contour is greater than a first brightness difference.

The second hue value may include 65, the first hue difference may include 23, the third quantity of pixels may include 600, the first preset ratio may include 0.5, and the first brightness difference may include 10.

Or, the second preset conditions include:

The contour height of the first contour is greater than a preset height, the abscissa of the lower right vertex of the first contour is greater than a second abscissa value, the quantity of pixels contained in the first contour is greater than a fourth quantity of pixels, the proportion of valid pixel values of the first contour is less than a third proportion, the average brightness roughness of the first contour is less than a third brightness roughness, the average brightness value of the first contour is within a preset brightness range, a difference between the average brightness values of the second contour and the first contour is less than a second brightness difference, the average brightness value of the second contour is less than a fourth brightness value, the average relative deviation value of the first contour and the second contour is greater than a second difference, the absolute value of a difference between the average hue values of the second contour and the first contour is greater than a second hue difference, and the peak of pixel quantity is greater than a fifth quantity of pixels.

The preset height may include 65, the second abscissa value may include 157, the fourth quantity of pixels may include 1500, the third proportion may include 0.71, the third brightness roughness may include 0.252, the preset brightness range may include 70-230, the second brightness difference may include 70, the fourth brightness value may include 200, the second difference may include 70, the second hue difference may include 17, and the fifth quantity of pixels may include 1400.

Or, the second preset conditions include:

A difference between the average brightness values of the second contour and the first contour is greater than a third brightness difference, the average brightness roughness of the first contour and the second contour are less than a fourth brightness roughness, the peak of pixel quantity is greater than a sixth quantity of pixels, the proportion of valid pixel values of the first contour is less than a fourth proportion, a difference between the average hue values of the first contour and the second contour is greater than a third hue difference, and the ratio of the average brightness roughness of the first contour and the second contour is less than a second preset ratio.

The third brightness difference may include 50, the fourth brightness roughness may include 0.26, the sixth quantity of pixels may include 400, the fourth proportion may include 0.895, the third hue difference may include 20, and the second preset ratio may include 0.5.

The above lists four groups of preset conditions. In actual comparison, as long as any group of the above preset conditions are satisfied, it may be considered that there is a non-lawn region.

Of course, the foregoing thresholds are not unique and may be determined based on actual situations, as long as the preset conditions are conducive to the recognition of non-lawn regions.

Figure 6:
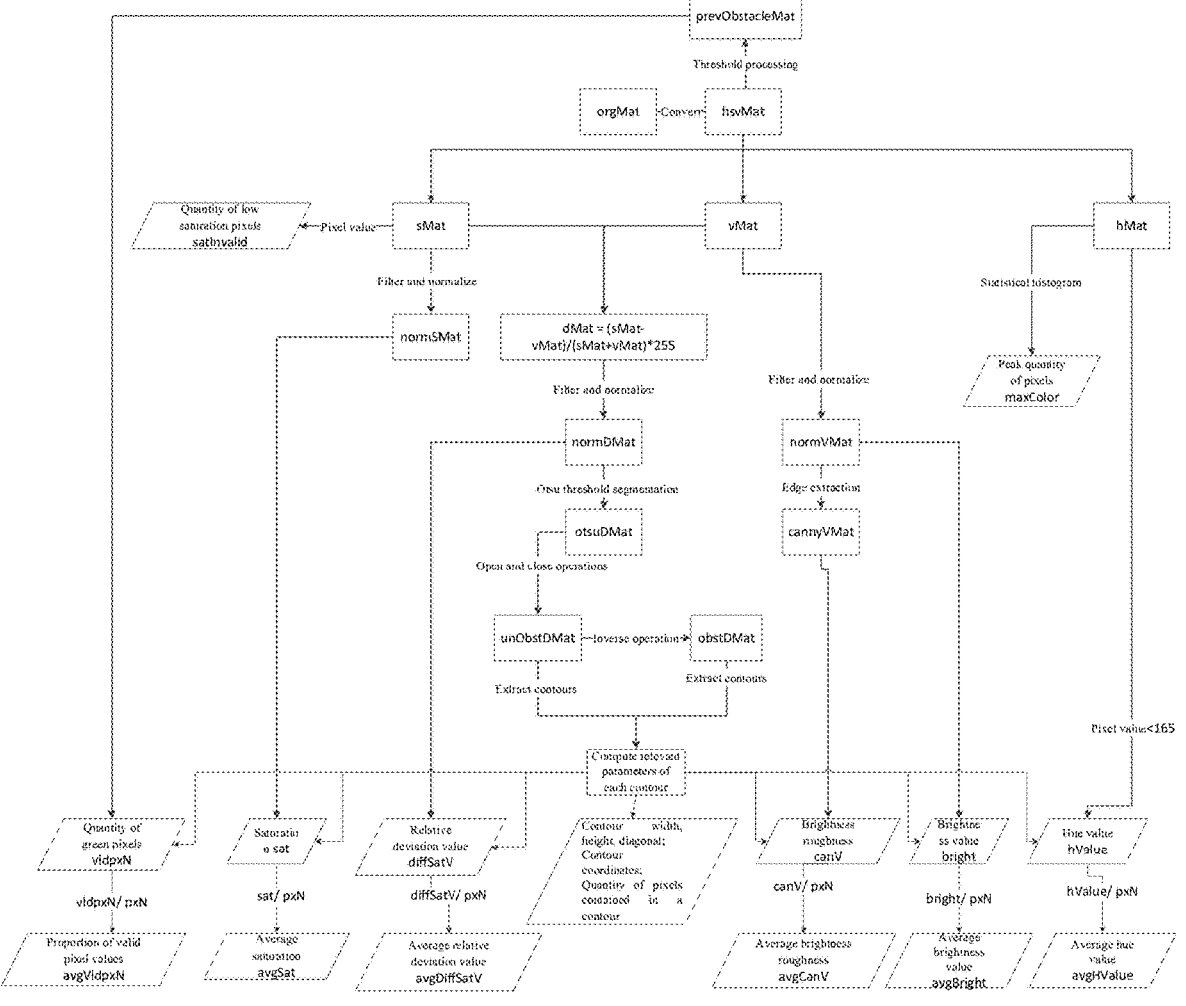
FIG. 6 is a flow block diagram of another specific example of the present application.

The image analysis method provided in this embodiment will be explained with a specific example with reference to FIG. 6 and FIGS. 7A and 7B:

First, an original image orgMat is obtained and converted into an HSV image hsvMat, which is then separated into a saturation channel image sMat, a hue channel image hMat, and a value channel image vMat (see FIG. 7 (*a*)).

Figure 7A:
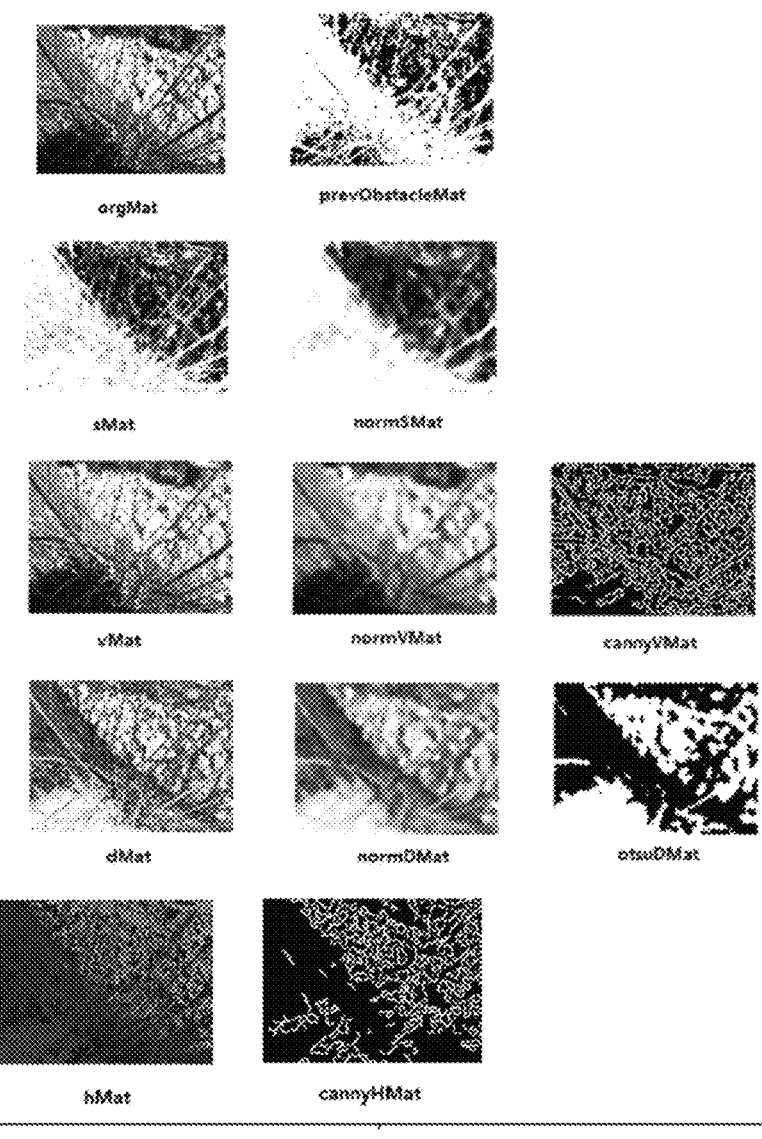
FIGS. 7A and 7B are schematic diagrams of each image obtained in another specific example of the present application.

Color segmentation is performed on the HSV image through a hue channel threshold, a value channel threshold, and a saturation channel threshold to obtain a target image prevObstacleMat (see FIG. 7A).

A relative deviation value image dMat is obtained according to the saturation channel image sMat and the value channel image vMat (see FIG. 7A).

With reference to FIGS. 7 (*a*) and (*b*), the relative deviation value image dMat is filtered and normalized to obtain an image normDMat, Otsu threshold segmentation is performed on the image normDMat to obtain an image otsuDMat, an open operation and a close operation are performed on the image otsuDMat to obtain an image unObstDMat, an inverse operation is performed on the image unObstDMat to obtain an image obstDMat, contour detection is performed on the image unObstDMat and the image obstDMat to extract first contours and second contours separately, and statistics on the width boundRect.width, height boundRect.height, diagonal boundRect.diagonal, coordinates, and quantity of pixels pxN of each contour are collected.

Statistics on a quantity of pixels with pixel values less than 38 in the saturation channel image sMat, namely, a quantity of low saturation pixels satInvalid, are collected.

With reference to FIG. 7A, the saturation channel image sMat is filtered and normalized to obtain an image normSMat, and a saturation Sat is obtained according to the image normSMat and divided by the quantity of pixels pxN of each contour to compute an average saturation avgSat of each contour.

A relative deviation value diffSatV is obtained according to the image normDMat and divided by the quantity of pixels pxN of each contour to compute an average relative deviation value avgDiffSatV of each contour.

With reference to FIG. 7A, the value channel image vMat is filtered and normalized to obtain an image normVMat, and edge extraction is performed on the image normVMat to obtain an image cannyVMat. A brightness value bright is determined according to the image normVMat and divided by the quantity of pixels pxN of each contour to compute an average brightness value avgBright of each contour, and a brightness roughness canV is determined according to the image cannyVMat and then divided by the quantity of pixels pxN of each contour to compute an average brightness roughness avgCanV of each contour.

A peak of pixel quantity maxColor is determined according to a hue histogram corresponding to the hue channel image hMat, and pixel values less than 165 are accumulated to obtain a hue value hValue, which is then divided by the quantity of pixels pxN of each contour to compute an average hue value avgHValue of each contour.

A quantity of green pixels vldpxN is determined according to the target image prevObstacleMat, and then divided by the quantity of pixels pxN of each contour to compute a proportion of valid pixel values avgVldpxN of each contour.

In this example, the second preset conditions are: a diagonal of the first contour is greater than 110, an ordinate of a lower right vertex of the first contour is greater than 65, an ordinate of an upper left vertex of the first contour is less than 10, the proportion of valid pixel values of the first contour is less than 0.35, the average brightness roughness of the first contour is greater than 0.17, the average brightness value of the first contour is greater than 105, the average brightness value of the second contour is greater than 95, a difference between the average relative deviation values of the first contour and the second contour is greater than 70, a difference between the average saturations of the second contour and the first contour is greater than 28, and the quantity of low saturation pixels is within 1800-4000.

Figure 7B:
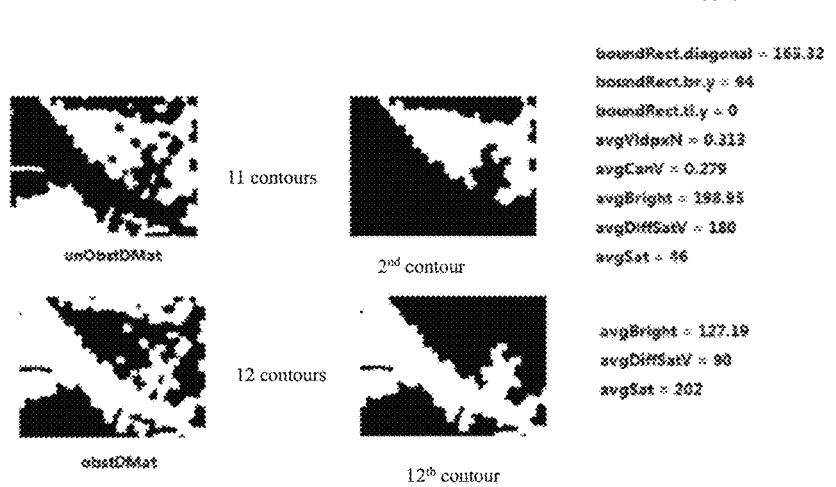

With reference to FIG. 7B, the analysis results show 11 first contours and 12 second contours.

Regarding the 2nd first contour:

The quantity of low saturation pixels satInvalid=3874, the contour diagonal boundRect.diagonal=165.32, an ordinate of a lower right vertex boundRect.br.y=94, an ordinate of an upper left vertex boundRect.tl.y=0, the proportion of valid pixel values avgVldpxN=0.313, the average brightness roughness avgCanV=0.279, the average brightness value avgBright=198.95, the average relative deviation value avgDiffSatV=180, and the average saturation avgSat=46.

Regarding the 12th second contour:

The average brightness value avgBright=127.19, the average relative deviation value avgDiffSatV=90, and the average saturation avgSat=202.

After analysis, it may be determined that the image features of the 2nd first contour and the 12th second contour and differences between the two satisfy the preset conditions, and there are non-lawn regions in the currently obtained original image.

It should be understood that, although the steps are displayed sequentially according to the instructions of arrows in the flowcharts of the embodiments described above, these steps are not necessarily performed sequentially according to the sequence instructed by the arrows. Unless otherwise explicitly specified in this application, execution of the steps is not strictly limited, and the steps may be performed in other sequences. Moreover, at least some of the steps in the flowchart of each embodiment may include a plurality of steps or a plurality of stages. The steps or stages are not necessarily performed at the same time, but may be performed at different times. Execution of the steps or stages is not necessarily sequentially performed, but may be performed alternately with other steps or at least some of steps or stages of other steps.

Based on the same invention concept, another embodiment of the present application further provides an image analysis apparatus for implementing the foregoing image analysis method. An implementation solution provided by the image analysis apparatus to solve problems is similar to that described in the foregoing method. Therefore, specific definitions in one or more embodiments of the image analysis apparatus provided below may be referred to the definitions on the foregoing image analysis method, and will not be repeated here.

Figure 8:
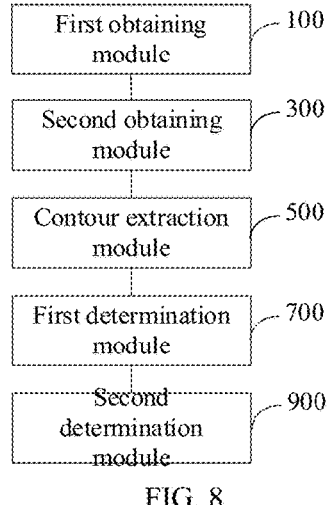
FIG. 8 is a schematic structural diagram of an image analysis apparatus provided in an embodiment of the present application.

With reference to FIG. 8, the image analysis apparatus provided in this embodiment includes a first obtaining module 100, a second obtaining module 300, a contour extraction module 500, a first determination module 700, and a second determination module 900.

The first obtaining module 100 is configured to obtain a saturation channel image and a value channel image according to an original image;

The second obtaining module 300 is configured to obtain a relative deviation value image based on the saturation channel image and the value channel image, where the relative deviation value image represents relative deviations between saturation and value;

The contour extraction module 500 is configured to extract several contours from the relative deviation value image;

The first determination module 700 is configured to determine target parameter values corresponding to each contour; and The second determination module 900 is configured to determine, according to analysis results of the target parameter values corresponding to each contour, whether there is a non-working region in the original image.

According to the image analysis apparatus provided in this embodiment of the present application, a saturation channel image and a value channel image are first obtained according to an original image, then a relative deviation value image is obtained based on the saturation channel image and the value channel image, several contours are extracted from the relative deviation value image, target parameter values corresponding to each contour are determined, and whether there is a non-working region in the original image is finally determined according to analysis results of the target parameter values corresponding to each contour. There are certain differences between relative deviation values of saturation and value of working regions and non-working regions, and this embodiment may use this characteristic to segment several contours from the relative deviation value image, then analyze parameters of each contour by combining the characteristics or differences of working regions and non-working regions, and recognize one by one whether there is a non-working region in each contour, thereby effectively reducing missing determination of non-working regions in the image, recognizing non-working regions in the image more accurately, and improving the efficiency and safety of an intelligent device.

In one embodiment, the second obtaining module 300 obtains the relative deviation value image by using the following formula:

$$dMat = \frac{sMat - vMat}{sMat + vMat} * 255$$

where dMat is the relative deviation value image, sMat is the saturation channel image, and vMat is the value channel image.

In one embodiment, the target parameter values include any of contour width, contour height, contour diagonal, quantity of pixels contained in a contour, contour coordinates, proportion of valid pixel values, average saturation, average relative deviation value, quantity of low saturation pixels, average brightness roughness, average brightness value, average hue value, average hue roughness, and peak of pixel quantity.

In one embodiment, the first determination module 700 is configured to:

convert the original image into an HSV image, perform color segmentation on the HSV image by combining a hue channel threshold, a saturation channel threshold, and a value channel threshold to obtain a target image;

obtain a quantity of green pixels in the target image; and determine a proportion of valid pixel values by combining the quantity of green pixels in the target image and a quantity of pixels contained in the contour.

In one embodiment, the first determination module 700 is further configured to:

determine the quantity of low saturation pixels according to the saturation channel image;

pre-process the saturation channel image;

determine a saturation according to the pre-processed image; and determine the average saturation by combining the saturation and the quantity of pixels contained in the contour.

In one embodiment, the first determination module 700 is further configured to:

pre-process the relative deviation value image;

determine a relative deviation value according to the pre-processed image; and determine an average relative deviation value according to the relative deviation value and the quantity of pixels contained in the contour.

In one embodiment, the first determination module 700 is further configured to:

pre-process the value channel image;

determine a brightness value according to the pre-processed image, and determine an average brightness value according to the brightness value and the quantity of pixels contained in the contour; and perform edge extraction on the pre-processed image to obtain an edge image, determine a brightness roughness according to the edge image, and determine an average brightness roughness according to the brightness roughness and the quantity of pixels contained in the contour.

In one embodiment, the first obtaining module 100 is configured to obtain a hue channel image according to the original image; and the first determination module 700 is further configured to:

determine a peak of pixel quantity and a hue value according to the hue channel image;

determine the average hue value according to the hue value and the quantity of pixels contained in the contour;

pre-process the hue channel image; and perform edge extraction on the pre-processed image to obtain an edge image, determine a hue roughness according to the edge image, and determine the average hue roughness according to the hue roughness and the quantity of pixels contained in the contour.

In one embodiment, the contour extraction module 500 is configured to:

perform threshold segmentation on the relative deviation value image;

perform an open operation and a close operation on the image after the threshold segmentation to obtain a first image; and extract several first contours from the first image.

In one embodiment, the second determination module 900 is configured to determine that there is the non-working region in the original image if the target parameter values corresponding to any first contour satisfy first preset conditions, where the first preset conditions include:

the average hue value is greater than a first hue value, the average hue roughness is less than a preset hue roughness, the average brightness roughness is less than a first brightness roughness, the proportion of valid pixel values is less than a first proportion, the average brightness value is greater than a first brightness value, the peak of pixel quantity is greater than a first quantity of pixels, an abscissa of a lower right vertex in contour coordinates is greater than a first abscissa value, and the quantity of pixels contained in the contour is less than a second quantity of pixels.

In one embodiment, the contour extraction module 500 is further configured to perform an inverse operation on the first image to obtain a second image, and extract several second contours from the second image.

The second determination module 900 is configured to determine that there is the non-working region in the original image if differences between the target parameter values corresponding to any first contour and the target parameter values corresponding to any second contour satisfy second preset conditions.

In one embodiment, the second preset conditions include: a diagonal of the first contour is greater than a preset value, an ordinate of a lower right vertex of the first contour is greater than a first ordinate value, an ordinate of an upper left vertex of the first contour is less than a second ordinate value, the proportion of valid pixel values of the first contour is less than a second proportion, the average brightness roughness of the first contour is greater than a second brightness roughness, the average brightness value of the first contour is greater than a second brightness value, the average brightness value of the second contour is greater than a third brightness value, a difference between the average relative deviation values of the first contour and the second contour is greater than a first difference, a difference between the average saturations of the second contour and the first contour is greater than a preset saturation difference, and the quantity of low saturation pixels is within a preset pixel quantity range;

Or, the second preset conditions include:
the average hue value of the first contour is greater than a second hue value, a difference between the average hue values of the first contour and the second contour is greater than a first hue difference, the peak of pixel quantity is greater than a third quantity of pixels, the ratio of the average brightness roughness of the first contour and the second contour is less than a first preset ratio, and a difference between the average brightness values of the first contour and the second contour is greater than a first brightness difference;

Or, the second preset conditions include:
the contour height of the first contour is greater than a preset height, the abscissa of the lower right vertex of the first contour is greater than a second abscissa value, the quantity of pixels contained in the first contour is greater than a fourth quantity of pixels, the proportion of valid pixel values of the first contour is less than a third proportion, the average brightness roughness of the first contour is less than a third brightness roughness, the average brightness value of the first contour is within a preset brightness range, a difference between the average brightness values of the second contour and the first contour is less than a second brightness difference, the average brightness value of the second contour is less than a fourth brightness value, the average relative deviation value of the first contour and the second contour is greater than a second difference, the absolute value of a difference between the average hue values of the second contour and the first contour is greater than a second hue difference, and the peak of pixel quantity is greater than a fifth quantity of pixels;

Or, the second preset conditions include:
a difference between the average brightness values of the second contour and the first contour is greater than a third brightness difference, the average brightness roughness of the first contour and the second contour are less than a fourth brightness roughness, the peak of pixel quantity is greater than a sixth quantity of pixels, the proportion of valid pixel values of the first contour is less than a fourth proportion, a difference between the average hue values of the first contour and the second contour is greater than a third hue difference, and the ratio of the average brightness roughness of the first contour and the second contour is less than a second preset ratio.

Each module in the foregoing image analysis apparatus may be implemented entirely or partially through software, hardware, or a combination thereof. The foregoing modules may be embedded in or independent of a processor in a computer device in a form of hardware, or stored in a memory of a computer device in a form of software, whereby the processor calls the modules to perform operations corresponding to the modules.

In one embodiment, a computer device is further provided, including a memory and a processor, the memory storing a computer program, and the steps in each of the foregoing method embodiments being implemented when the processor performs the computer program.

Figure 9:
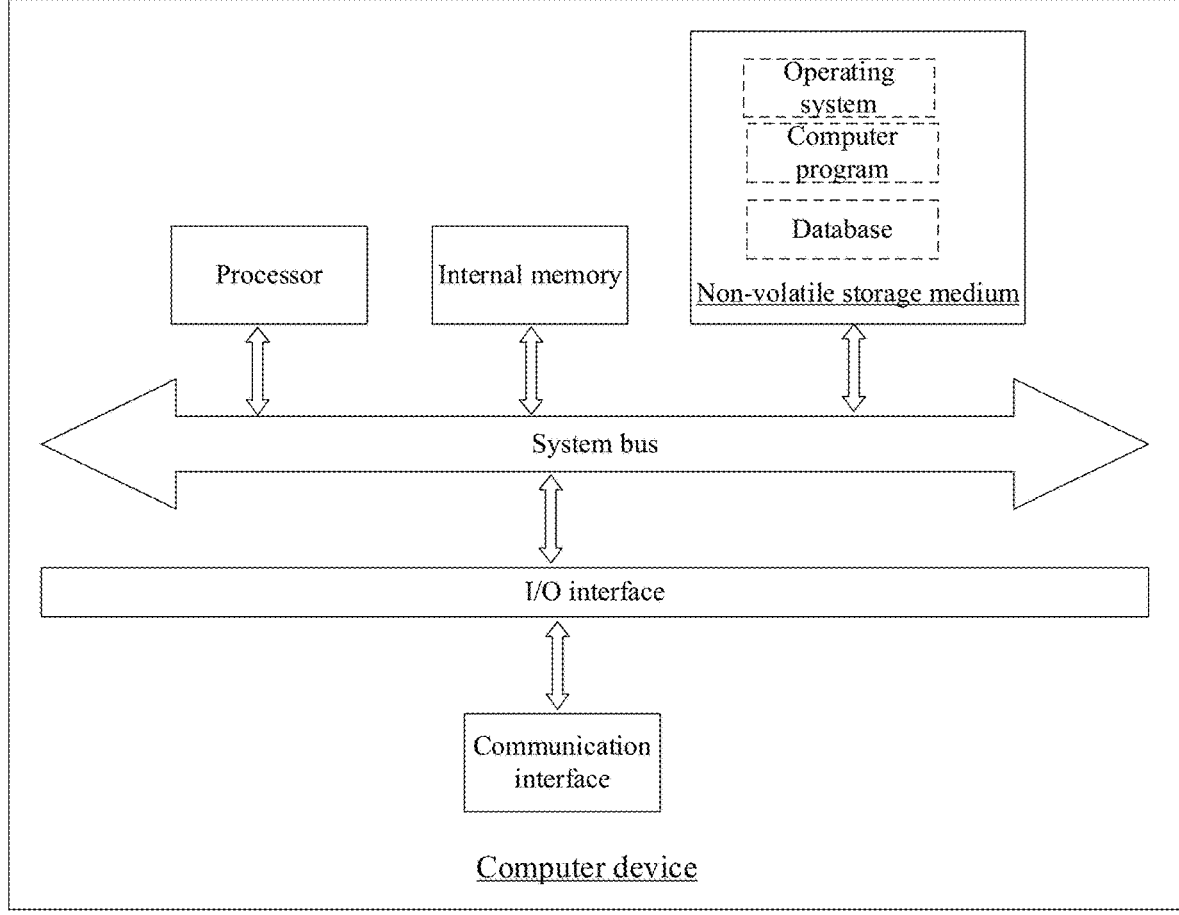
FIG. 9 is a schematic structural diagram of a computer device provided in an embodiment of the present application.

FIG. 9 is a schematic structural diagram of a computer device provided in an embodiment of the present application. The computer device may be a server, and its internal structure may be shown in FIG. 9. The computer device includes a processor, a memory, and a network interface that are connected through a system bus. The processor of the computer device is configured to provide computing and control capabilities. The memory of the computer device includes a non-volatile storage medium and an internal memory. The non-volatile storage medium stores an operating system, a computer program, and a database. The internal memory provides an environment for running of the operating system and the computer program in the non-volatile storage medium. The database of the computer device is configured to store various data involved in the image analysis method. The network interface of the computer device is configured to communicate with an external terminal through a network connection. The computer program is executed by the processor to implement an image analysis method.

Those skilled in the art may understand that the structure shown in FIG. 9 is only a block diagram of a partial structure related to the solution of the present application, and does not constitute a limitation on the computer device to which the solution of the present application is applied. The specific computer device may include more or fewer parts than shown in the figure, or combine some parts, or have a different arrangement of parts.

In one embodiment, a computer-readable storage medium storing a computer program is provided, the steps in each of the foregoing method embodiments being implemented when the computer program is performed by a processor.

A person of ordinary skill in the art may understand that all or part of the processes in the methods of the foregoing embodiments may be implemented by a computer program instructing relevant hardware. The computer program may be stored in a non-volatile computer-readable storage medium. The computer program, when executed, may include the processes of the embodiments of the above methods. Any reference to the memory, storage, database or other media used in the embodiments provided by the present application may include at least one of non-volatile and volatile memories. The non-volatile memory may include a Read-Only Memory (ROM), a magnetic tape, a floppy disk, a flash memory, or an optical memory. The volatile memory may include a Random Access Memory (RAM) or an external cache memory. As an illustration and not a limitation, the RAM may be in many forms, such as a static random-access memory (SRAM) or a dynamic random-access memory (DRAM).

The technical features of the above embodiments may be combined arbitrarily. For the purpose of simplicity in description, all possible combinations of the technical features in the above embodiments are not described. However, as long as the combinations of these technical features do not have contradictions, they shall fall within the scope of this specification.

The foregoing embodiments only describe several implementations of the present application, and their descriptions are specific and detailed, but cannot therefore be understood as limitations to the patent scope. It should be noted that, for a person of ordinary skill in the art, many transformations and improvements may be made without departing from the idea of this application. These transformations and improvements fall within the protection scope of this application. Therefore, the protection scope of the present application should be subject to the appended claims.

The invention claimed is:

1. An image analysis method for distinguishing in a ground area a lawn region from a non-lawn region, the lawn region being a working region and the non-lawn region being a non-working region, so that an intelligent lawn mower may work in the lawn region and avoid working in the non-lawn region, the method comprising:

obtaining a saturation channel image and a value channel image according to an original image of the ground area;

obtaining a relative deviation value image based on the saturation channel image and the value channel image, wherein the relative deviation value image represents relative deviations between saturation and value;

extracting several contours from the relative deviation value image;

determining target parameter values corresponding to each contour; and determining according to analysis results of the target parameter values corresponding to each contour whether a non-working region exists in the original image wherein the intelligent lawn mower avoids working in the non-working region based on the determination that the non-working region exists in the original image, wherein the step of obtaining the relative deviation value image based on the saturation channel image and the value channel image comprises:

obtaining the relative deviation value image by using the following formula:

$$dMat = \frac{sMat - vMat}{sMat + vMat} * 255$$

wherein dMat is the relative deviation value image, sMat is the saturation channel image, and vMat is the value channel image.

2. The image analysis method according to claim 1, wherein the target parameter values comprise any of a contour width, a contour height, a contour diagonal, a quantity of pixels contained in a contour, contour coordinates, a proportion of valid pixel values, an average saturation, an average relative deviation value, a quantity of low saturation pixels, an average brightness roughness, an average brightness value, an average hue value, an average hue roughness, and a peak of pixel quantity.

3. The image analysis method according to claim 2, wherein the step of determining the target parameter values corresponding to each contour comprises the steps of:

converting the original image into an HSV image;

performing color segmentation on the HSV image by combining a hue channel threshold, a saturation channel threshold, and a value channel threshold to obtain a target image;

obtaining a quantity of green pixels in the target image; and determining a proportion of valid pixel values by combining the quantity of green pixels in the target image and a quantity of pixels contained in the contour.

4. The image analysis method according to claim 2, wherein the step of determining the target parameter values corresponding to each contour further comprises the steps of:

determining the quantity of low saturation pixels according to the saturation channel image;

pre-processing the saturation channel image to obtain a pre-processed image;

determining a saturation according to the pre-processed image; and determining the average saturation by combining the saturation and the quantity of pixels contained in the contour.

5. The image analysis method according to claim 2, wherein the step of determining the target parameter values corresponding to each contour further comprises the steps of:

pre-processing the relative deviation value image to obtain a processed image;

determining a relative deviation value according to the pre-processed image; and determining the average relative deviation value according to the relative deviation value and the quantity of pixels contained in the contour.

6. The image analysis method according to claim 2, wherein the step of determining target parameter values corresponding to each contour further comprises the steps of:

pre-processing the value channel image to obtain a pre-processed image;

determining a brightness value according to the pre-processed image, and determining the average brightness value based on the brightness value and the quantity of pixels contained in the contour; and performing edge extraction on the pre-processed image to obtain an edge image, determining a brightness roughness according to the edge image, and determining the average brightness roughness according to the brightness roughness and the quantity of pixels contained in the contour.

7. The image analysis method according to claim 2, further comprising obtaining a hue channel image according to the original image; and the step of determining the target parameter values corresponding to each contour further comprises the steps of:

determining the peak of pixel quantity and a hue value according to the hue channel image;

determining the average hue value according to the hue value and the quantity of pixels contained in the contour;

pre-processing the hue channel image to obtain a pre-processed image; and performing edge extraction on the pre-processed image to obtain an edge image, determining a hue roughness according to the edge image, and determining the average hue roughness according to the hue roughness and the quantity of pixels contained in the contour.

8. The image analysis method according to claim 2, wherein the step of extracting several contours from the relative deviation value image comprises the steps of:

performing a threshold segmentation on the relative deviation value image to obtain a threshold segmentation image;

performing an open operation and a close operation on the threshold segmentation image after the threshold segmentation to obtain a first image; and extracting several first contours from the first image.

9. The image analysis method according to claim 8, wherein the step of determining according to analysis results of the target parameter values corresponding to each contour whether the non-working region exists in the original image comprises:

determining that the non-working region exists in the original image if the target parameter values corresponding to any first contour satisfy first preset conditions, wherein the first preset conditions comprise:

the average hue value is greater than a first hue value, the average hue roughness is less than a preset hue roughness, the average brightness roughness is less than a first brightness roughness, the proportion of valid pixel values is less than a first proportion, the average brightness value is greater than a first brightness value, the peak of pixel quantity is greater than a first quantity of pixels, an abscissa of a lower right vertex in contour coordinates is greater than a first abscissa value, and the quantity of pixels contained in the contour is less than a second quantity of pixels.

10. The image analysis method according to claim 8, further comprising, after the step of obtaining the first image, the steps of:

performing an inverse operation on the first image to obtain a second image; and extracting several second contours from the second image;

the determining according to analysis results of the target parameter values corresponding to each contour whether the non-working region exists in the original image comprises:

determining that the non-working region exists in the original image if differences between the target parameter values corresponding to any first contour and the target parameter values corresponding to any second contour satisfy second preset conditions.

11. The image analysis method according to claim 10, wherein the second preset conditions comprise:

a diagonal of the first contour is greater than a preset value, an ordinate of a lower right vertex of the first contour is greater than a first ordinate value, an ordinate of an upper left vertex of the first contour is less than a second ordinate value, a proportion of valid pixel values of the first contour is less than a second proportion, an average brightness roughness of the first contour is greater than a second brightness roughness, an average brightness value of the first contour is greater than a second brightness value, an average brightness value of the second contour is greater than a third brightness value, a difference between an average relative deviation values of the first contour and the second contour is greater than a first difference, a difference between an average saturations of the second contour and the first contour is greater than a preset saturation difference, and a quantity of low saturation pixels is within a preset pixel quantity range;

or, wherein the second preset conditions comprise:

an average hue value of the first contour is greater than a second hue value, a difference between the average hue values of the first contour and the second contour is greater than a first hue difference, the peak of pixel quantity is greater than a third quantity of pixels, a ratio of the average brightness roughness of the first contour and the second contour is less than a first preset ratio, and a difference between the average brightness values of the first contour and the second contour is greater than a first brightness difference;

or, wherein the second preset conditions comprise:

a contour height of the first contour is greater than a preset height, an abscissa of the lower right vertex of the first contour is greater than a second abscissa value, a quantity of pixels contained in the first contour is greater than a fourth quantity of pixels, a proportion of valid pixel values of the first contour is less than a third proportion, the average brightness roughness of the first contour is less than a third brightness roughness, the average brightness value of the first contour is within a preset brightness range, the difference between the average brightness values of the first contour and the second contour is less than a second brightness difference, the average brightness value of the second contour is less than a fourth brightness value, the average relative deviation value of the first contour and the second contour is greater than a second difference, an absolute value of a difference between the average hue values of the second contour and the first contour is greater than a second hue difference, and the peak of pixel quantity is greater than a fifth quantity of pixels;

or, wherein the second preset conditions comprise:

the difference between the average brightness values of the first contour and the second contour is greater than a third brightness difference, the average brightness roughness of the first contour and the second contour are less than a fourth brightness roughness, the peak of pixel quantity is greater than a sixth quantity of pixels, the proportion of valid pixel values of the first contour is less than a fourth proportion, the difference between the average hue values of the first contour and the second contour is greater than a third hue difference, and the ratio of the average brightness roughness of the first contour and the second contour is less than a second preset ratio.

12. A computer device comprising a memory and a processor, the memory storing a computer program, wherein the processor implements the image analysis method according to claim 1 when executing the computer program.

13. A non-transitory computer-readable storage medium storing a computer program, wherein the image analysis method according to claim 1 is implemented when the computer program is executed by a processor.

\* \* \* \* \*